(12) United States Patent
Hsieh

(10) Patent No.: US 7,339,806 B2
(45) Date of Patent: Mar. 4, 2008

(54) ADJUSTMENT DEVICE FOR ADJUSTING WAVE SHAPE OF OUTPUT OF A DC-AC INVERTER

(76) Inventor: Yuan-Tai Hsieh, No. 28, Lane 32, Yung Hua Rd., Yung Kang City, Tainan Hsien (TW)

( * ) Notice: Subject to any disclaimer, the term of this patent is extended or adjusted under 35 U.S.C. 154(b) by 41 days.

(21) Appl. No.: 11/294,518

(22) Filed: Dec. 6, 2005

(65) Prior Publication Data
US 2007/0127278 A1    Jun. 7, 2007

(51) Int. Cl.
*H02M 7/539* (2006.01)
(52) U.S. Cl. ............................ 363/71; 363/95
(58) Field of Classification Search ............ 363/21.07, 363/21.15, 95, 71
See application file for complete search history.

(56) References Cited
U.S. PATENT DOCUMENTS 4,439,821 A * 3/1984 Grippe ......................... 363/26
4,862,339 A * 8/1989 Inou et al. ................. 363/21.07
5,267,138 A * 11/1993 Shores .......................... 363/98
7,057,907 B2 * 6/2006 Oh ............................ 363/21.05
2003/0197995 A1 * 10/2003 Hua et al. .................... 361/100
2005/0111242 A1 * 5/2005 Oh ............................ 363/21.07

* cited by examiner

*Primary Examiner*—Jeffrey Sterrett
(74) *Attorney, Agent, or Firm*—Rosenberg, Klein & Lee

(57) ABSTRACT

A DC-AC inverter has an adjustment device for adjusting wave shape of output thereof includes a feedback circuit, and a zero-crossing detector; the feedback circuit will detect and measure output voltage of the inverter, and feedback-control the inverter to make the inverter output a demanded stable fixed voltage, thus preventing the output voltage of the inverter from changing owing to an input voltage and the loading effect caused by electric appliances connected thereto; the zero-crossing detector is used to detect and measure the frequency and wave shape of the output of the DC-AC inverter therefore the DC-AC inverter can be further connected in parallel to another DC-AC inverter or an utility grid when the feedback circuit is used to feedback-control the inverter for the inverter to provide a demanded stable fixed voltage output.

3 Claims, 6 Drawing Sheets

ADJUSTMENT DEVICE FOR ADJUSTING WAVE SHAPE OF OUTPUT OF A DC-AC INVERTER

BACKGROUND OF THE INVENTION

1. Field of the Invention

The present invention relates to an adjustment device for adjusting wave shape of output of a DC-AC inverter, more particularly one, which will make the inverter provide a demanded stable fixed voltage output, preventing output voltage of the inverter from changing owing to the loading effect caused by electric appliances connected to the inverter, and which allows the inverter to be connected to an utility.

2. Brief Description of the Prior Art

DC-AC inverters are usually used in wide-open country and regions where there is access to the utility, which will convert the DC source of batteries in vehicles, boats, and planes into AC one for powering various electric appliances.

People are paying more and more attention to renewable sources of energy such as solar, wind and hydraulic energies owing to their understanding of the importance of environmental protection and the seriousness of energy crisis. Renewable sources of energy are in the form of direct current, which has to be converted into AC electricity by means of an inverter before it is used to power common electric appliances and equipments.

Referring to FIG. 9, a currently existing DC-AC inverter 5 includes a control device 51, a driving circuit 52, a DC-to-DC converter 53 connected to the driving circuit 52, a linking circuit 54 connected to the DC-to-DC converter 53, a driver 55 connected to the control device 51, a sine wave generator 56 connected to the driver 55, and a DC-to-AC converter 57 connected to both the sine wave generator 56 and the linking circuit 54. The control device 51 can be equipped with a digital circuit or microcontroller, and it is connected to the driving circuit 52. Therefore, direct current source will be sent to and boosted by the DC-to-DC converter 53, and the DC source with boosted voltage will be sent to the linking circuit 54. The DC-to-AC converter 57 will convert DC source into AC source, and the AC source will be sent to the linking circuit 54. The circuit of the inverter 5 is prone to burn if the duty cycle exceeds 50% at the front stage. And, the higher the duty cycle generated by the sine wave generator 56 is, the more the output voltage of the inverter 5 will be. Therefore, the output voltage of the inverter 5 is adjusted with the help of the sine wave generator 56, which will generate such a duty cycle wave shape that the duty cycle will be lower than 50% at the front stage.

Therefore, the DC-AC inverter can convert DC source into AC one for various common electric appliances. However, the output voltage of the inverter will drop owing to the loading effect caused by an electric appliance connected to the output terminals of the inverter, causing much inconvenience. Furthermore, the frequency of the output DC source of the inverter isn't necessarily equal to that of other DC-AC inverters. Consequently, the inverter can't be connected in parallel to another inverter or the utility grid, and there is room for improvement.

SUMMARY OF THE INVENTION

It is a main object of the present invention to provide an adjustment device for adjusting wave shape of output of an inverter to overcome the above-mentioned problems. The adjustment device of the present invention includes a feedback circuit, and a microcontroller having a built-in A/D (analog-to-digital) converter; the feedback circuit includes a capacitance, and a rectifier. The microcontroller is connected to both the feedback circuit and an inverter such that the feedback circuit will detect and measure output voltage of the DC-AC inverter, and feedback-control the inverter for the inverter to provide a demanded stable fixed voltage output, thus preventing output voltage of the inverter from changing owing to an input voltage and the loading effect caused by electric appliances connected to the inverter.

Another preferred embodiment of the present invention includes a feedback circuit, a zero-crossing detector, and a microcontroller having a built-in analog-to-digital converter; the feedback circuit includes a capacitance, and a rectifier. The microcontroller is connected to both the feedback circuit and an inverter such that the feedback circuit will detect and measure output voltage of the DC-AC inverter, and feedback-control the inverter for the inverter to provide a demanded stable fixed voltage output, thus preventing output voltage of the inverter from changing owing to an input voltage and the loading effect caused by other electric appliances. The zero-crossing detector includes transistors and several resistors, and it is connected to the microcontroller for detecting and measuring the frequency and wave shape of the output of the inverter; thus, the inverter can be further connected in parallel to another inverter or the utility.

BRIEF DESCRIPTION OF THE DRAWINGS

The present invention will be better understood by referring to the accompanying drawings, wherein.

DETAILED DESCRIPTION OF THE PREFERRED EMBODIMENTS

Figure 1:
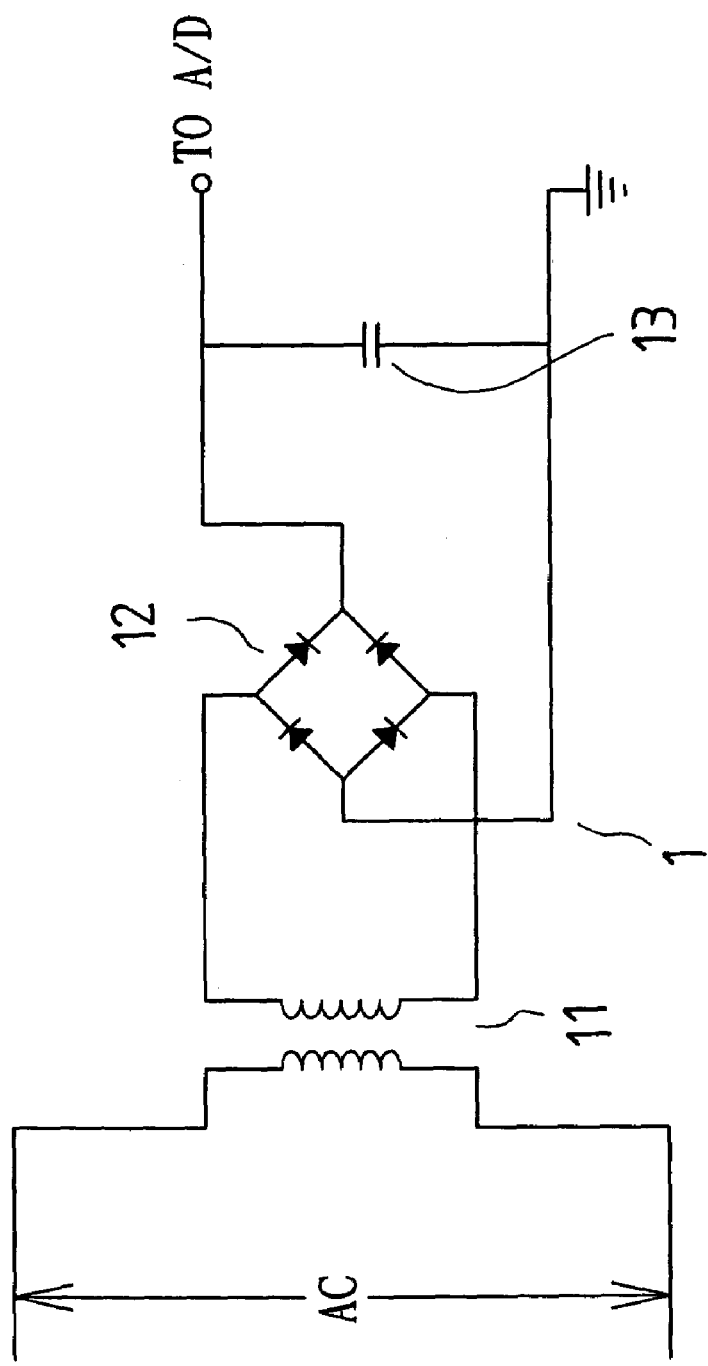
FIG. 1 is a circuit diagram of the first feedback circuit according to the present invention.
Figure 3:
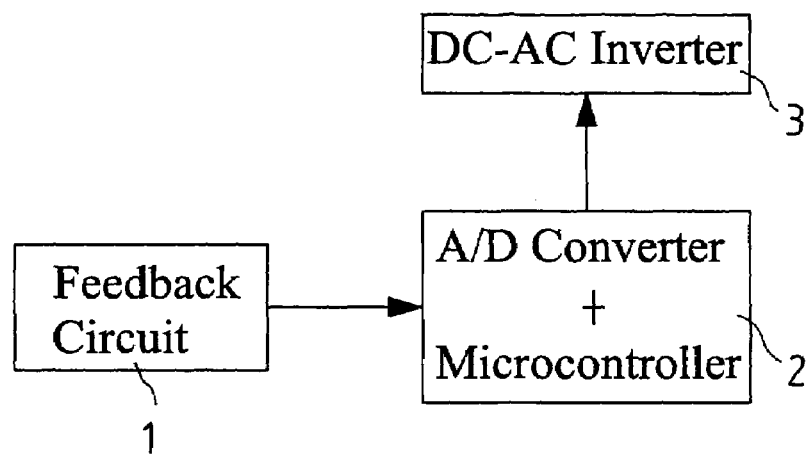
FIG. 3 is a block diagram of the first preferred embodiment of an adjustment device in the present invention.

Referring to FIGS. 1 and 3, a first preferred embodiment of an adjustment device for adjusting wave shape of output of a DC-AC inverter in the present invention includes a feedback circuit 1, and a microcontroller 2.

Figure 2:
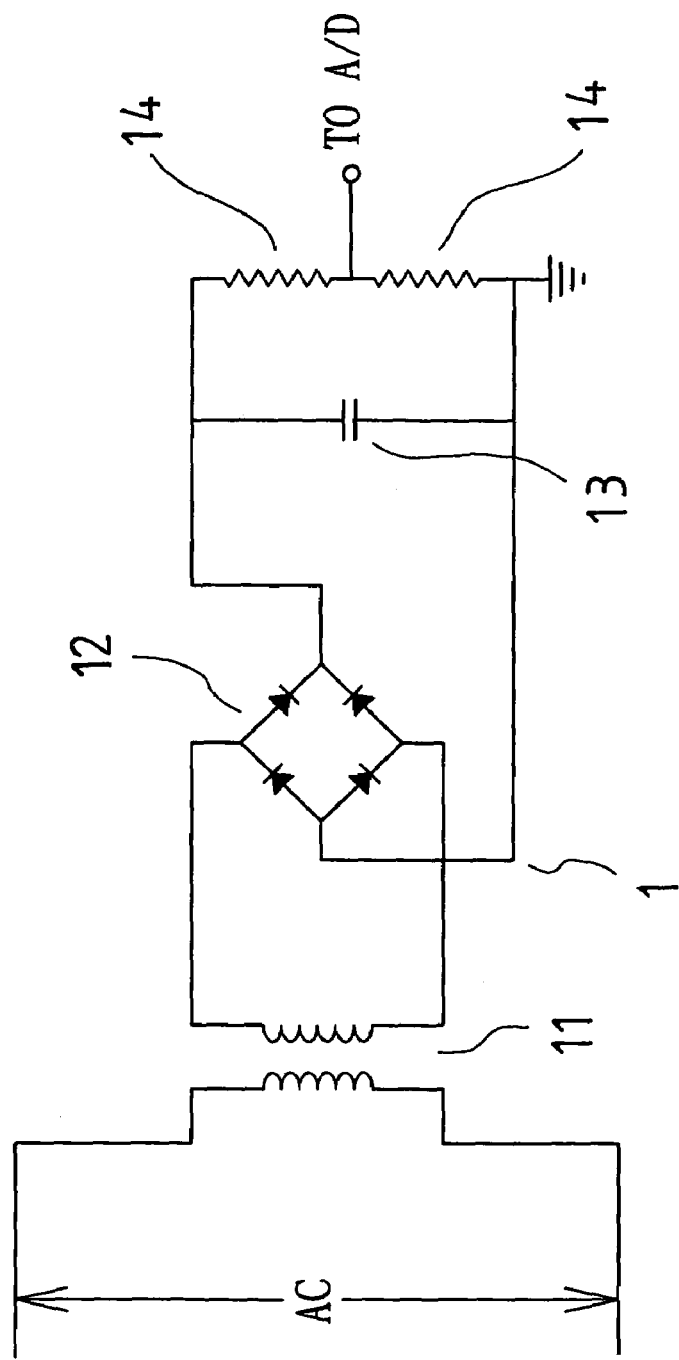
FIG. 2 is a circuit diagram of the second feedback circuit.

The feedback circuit 1 includes a transformer 11, a rectifier 12, and a capacitance 13; the transformer 11 has a primary terminal for connection to an alternating current power source, and it is connected to the rectifier 12 at a secondary terminal thereof; the rectifier 12 is connected in parallel to the capacitance 13 at output terminals thereof. Referring to FIG. 2, which shows another preferred embodiment of a feedback circuit 1, after the transformer 11 is connected to the rectifier 12 at the secondary terminal, and the rectifier 12 is connected in parallel to the capacitance 13 at the output terminals, several resistances 14 are connected in parallel to the capacitance 13.

Figure 4:
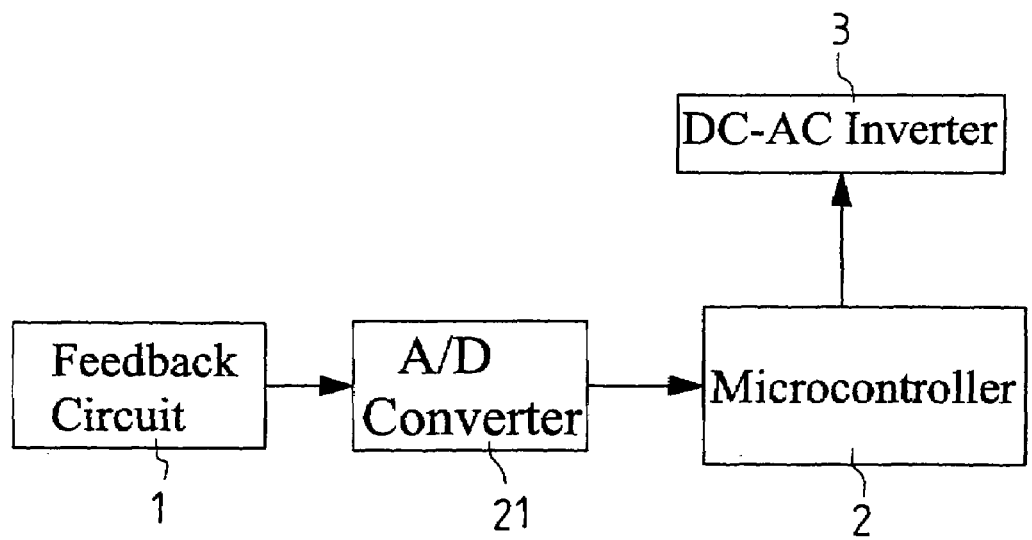
FIG. 4 is a block diagram of the second preferred embodiment of an adjustment device in the present invention.

Referring to FIG. 3, the microcontroller 2 has a built-in A/D (analog-to-digital) converter, and it is connected to both an output terminal of the feedback circuit 1 and a DC-AC inverter 3. Referring to FIG. 4, which shows a second preferred embodiment of the adjustment device in the present invention, instead of being directly connected to the microcontroller 2, the feedback circuit 1 is connected to an A/D (analog-to-digital) converter 21 at the output terminal thereof, and the microcontroller 2 is connected to both the A/D (analog-to-digital) converter 21 and the inverter 3. Furthermore, the transformer 11 of the feedback circuit 1 is connected to alternating current output voltage of the DC-AC inverter 3 at the primary terminal thereof. Therefore, the feedback circuit 1 will detect and measure output voltage of the inverter 3, and feedback-control the DC-AC inverter 3 for the DC-AC inverter 3 to provide a demanded stable fixed voltage output.

Figure 5:
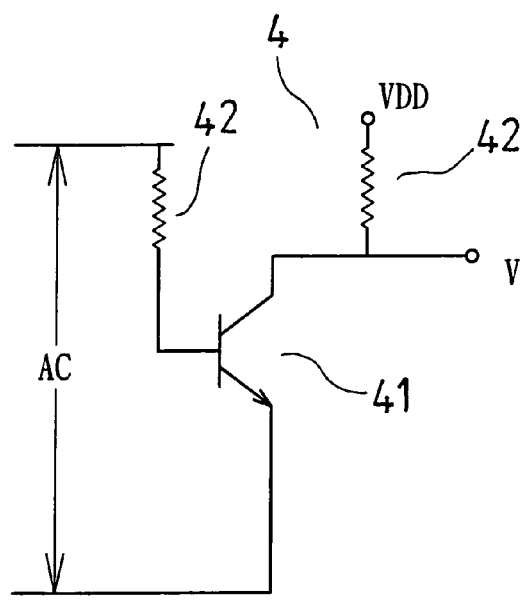
FIG. 5 is a circuit diagram of the first zero-crossing detector.
Figure 6:
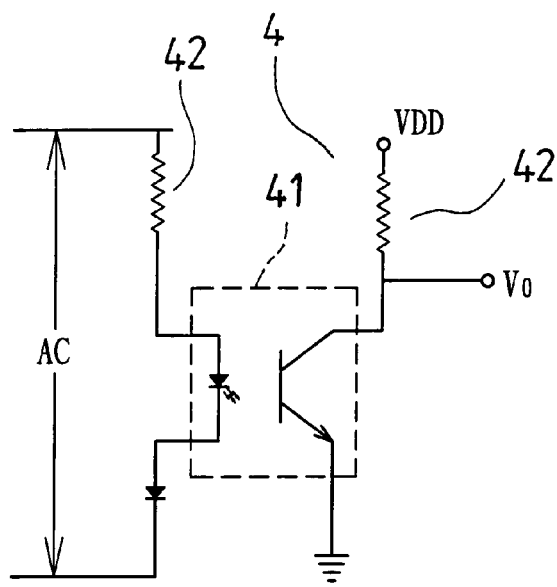
FIG. 6 is a circuit diagram of the second zero-crossing detector.

The adjustment device of the present invention is further equipped with a zero-crossing detector 4. Referring to FIG. 5, the zero-crossing detector 4 includes a transistor 41, and two resistors 42, which are connected to the base and the collector of the transistor 41 respectively; the transistor 41 can be a photo coupling transistor, as shown in FIG. 6.

Figure 7:
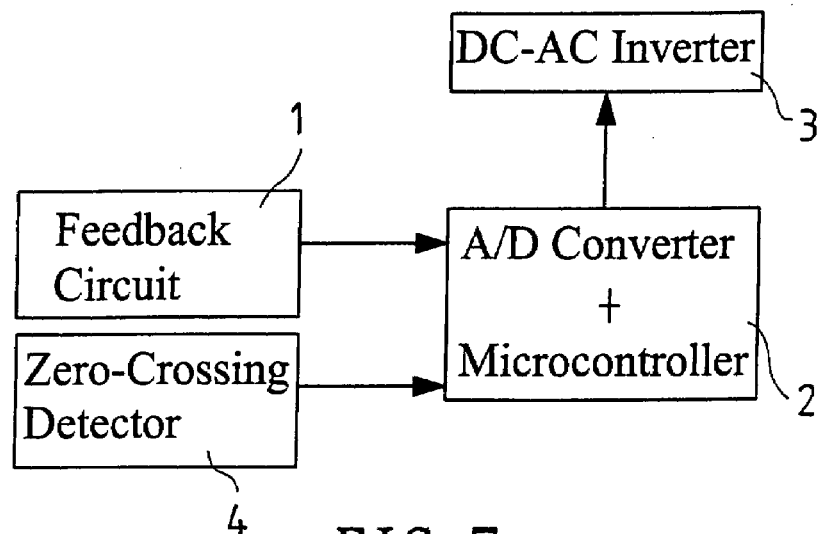
FIG. 7 is a block diagram of the first preferred embodiment with the zero-crossing detector.
Figure 8:
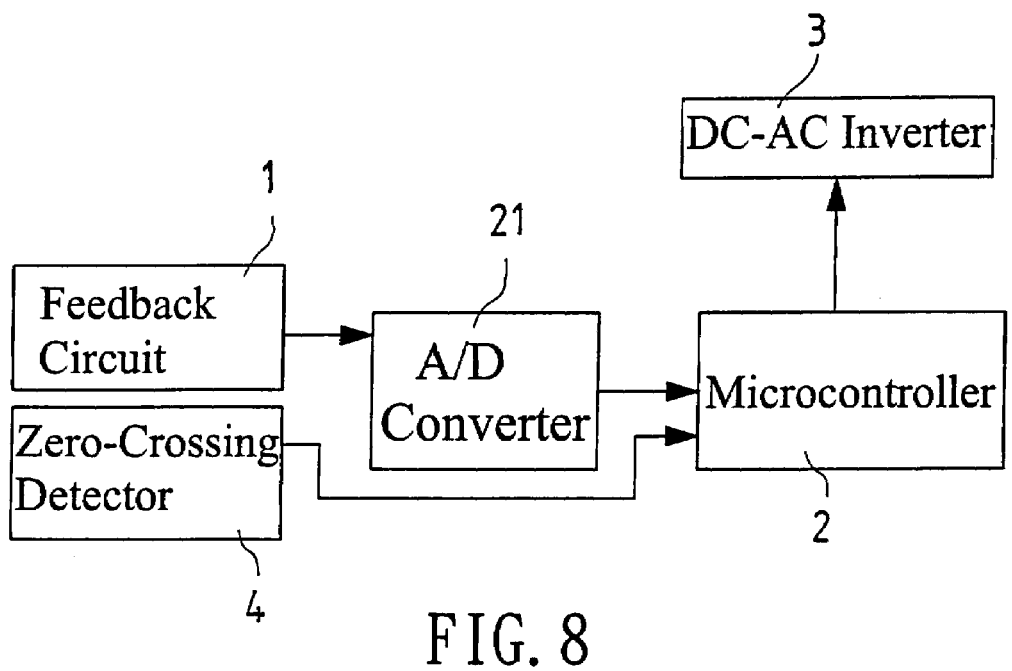
FIG. 8 is a block diagram of the second preferred embodiment with the zero-crossing detector.
Figure 9:
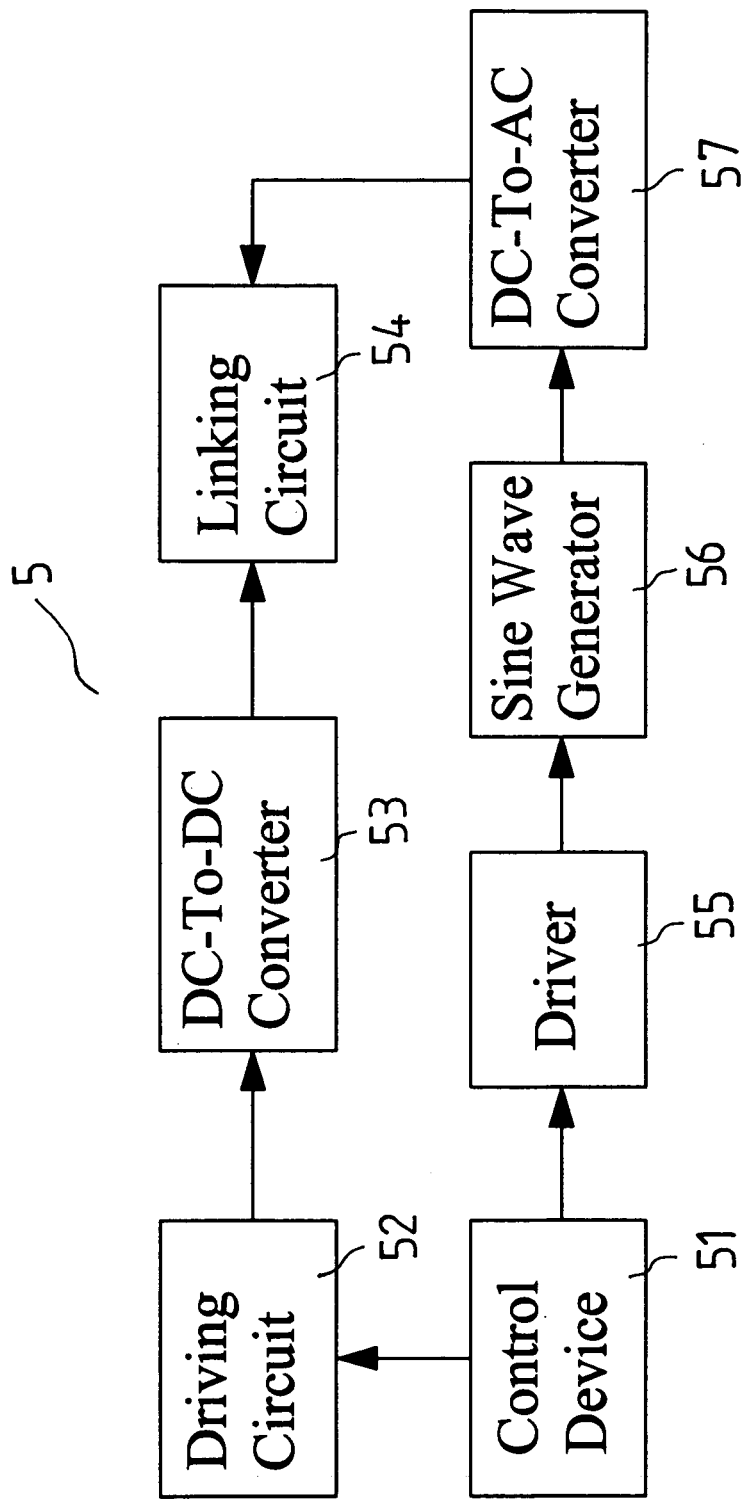
FIG. 9 is a block diagram of the currently existing DC-AC inverter.

Referring to FIG. 7, for use on the first preferred embodiment shown in FIG. 3, the zero-crossing detector 4 is connected to the microcontroller 2, which has a built-in A/D (analog-to-digital) converter. Referring to FIG. 8, for use on the second preferred embodiment shown in FIG. 4, instead of being directly connected to the microcontroller 2, the zero-crossing detector 4 is connected to the A/D (analog-to-digital) converter 21, which is connected to both the feedback circuit 1 and the microcontroller 2. Therefore, by means of using the zero-crossing detector 4 to detect and measure the frequency of the output voltage of the inverter 3, the DC-AC inverter 3 can be further connected in parallel to another inverter or an utility grid when the feedback circuit 1 is used to feedback-control the DC-AC inverter 3 for allowing the DC-AC inverter 3 to provide a demanded stable fixed voltage output.

From the above description, it can be easily seen that the present invention has the following advantages over the prior art:

1. The output voltage of an inverter is prevented from changing owing to an input voltage and the loading effect caused by electric appliances connected thereto by means of using the feedback circuit to detect and measure output voltage of the inverter and feedback-control the inverter for the inverter to provide a stable fixed voltage output.

2. When the feedback circuit is used to feedback-control the inverter to make the inverter output a demanded stable fixed voltage, the inverter is allowed to be connected in parallel to another inverter or an utility grid because there is the zero-crossing detector used to detect and measure the frequency and wave shape of the output of the inverter. Therefore, the present invention is economical to use.

What is claimed is:

1. An adjustment device for adjusting a wave shape of an output of a DC-AC inverter, comprising
   (a) a feedback circuit; the feedback circuit including:
      a transformer having a primary terminal for connection to an alternating current output of the DC-AC inverter;
      a capacitance; and
      a rectifier; the rectifier being connected to a secondary terminal of the transformer; the rectifier being connected in parallel to the capacitance at output terminals thereof;
   (b) a microcontroller having a built-in analog-to-digital converter; the microcontroller being connected to both an output terminal of the feedback circuit and to the DC-AC inverter for receiving a voltage signal detected by the feedback circuit and using the voltage signal to measure an output voltage of the DC-AC inverter, and providing feedback-control the DC-AC inverter for allowing the DC-AC inverter to provide a stable fixed AC voltage output; and
   (c) a zero-crossing detector having an input coupled to the fixed AC voltage output and an output coupled to the microcontroller, the microcontroller using the output of the zero-crossing detector to control the frequency of the DC-AC inverter and thereby adapt the output of the DC-AC inverter for a parallel connection with another DC-AC inverter.

2. An adjustment device for adjusting a wave shape of an output of a DC-AC inverter, comprising
   (a) a feedback circuit; the feedback circuit including:
      a transformer having a primary terminal for connection to an alternating current output of the DC-AC inverter;
      a capacitance; and
      a rectifier; the rectifier being connected to a secondary terminal of the transformer; the rectifier being connected in parallel to the capacitance at output terminals thereof;
   (b) a microcontroller having a built-in analog-to-digital converter; the microcontroller being connected to both an output terminal of the feedback circuit and the DC-AC inverter for controlling an AC output voltage thereof; and
   (c) a zero-crossing detector having an output coupled to the microcontroller; the zero-crossing detector including a transistor, and resistors, which are connected to a base and a collector of the transistor respectively, the microcontroller using the output of the zero-crossing detector to measure and control a frequency of the AC output of the DC-AC inverter to thereby adapt the AC output of the DC-AC inverter for a parallel connection with another DC-AC inverter.

3. An adjustment device for adjusting a wave shape of an output of a DC-AC inverter, comprising
   (a) a feedback circuit; the feedback circuit including:
      a transformer having a primary terminal for connection to an alternating current output of the DC-AC inverter;
      a capacitance; and
      a rectifier; the rectifier being connected to a secondary terminal of the transformer; the rectifier being connected in parallel to the capacitance at output terminals thereof;
   (b) a microcontroller having a built-in analog-to-digital converter; the microcontroller being connected to both an output terminal of the feedback circuit and the DC-AC inverter; and
   (c) a zero-crossing detector; the zero-crossing detector including a transistor, and resistors, which are connected to a base and a collector of the transistor respectively; the collector of the transistor being connected to the microcontroller to provide an output of the zero-crossing detector thereto, the microcontroller using the output of the zero-crossing detector to measure and control a frequency of the AC output of the DC-AC inverter and thereby adapt the AC output of the DC-AC inverter to be connected to a utility grid to contribute power thereto.

* * * * *